United States Patent
Waddell et al.

(10) Patent No.: US 9,237,297 B1
(45) Date of Patent: Jan. 12, 2016

(54) JUMP VIEW INTERACTIVE VIDEO SYSTEM

(76) Inventors: Kenneth M. Waddell, Westfield, NJ (US); Michael S. Simon, Penn Valley, PA (US)

( * ) Notice: Subject to any disclaimer, the term of this patent is extended or adjusted under 35 U.S.C. 154(b) by 682 days.

(21) Appl. No.: 13/312,607

(22) Filed: Dec. 6, 2011

Related U.S. Application Data

(60) Provisional application No. 61/420,110, filed on Dec. 6, 2010.

(51) Int. Cl.
*G06F 3/00* (2006.01)
*G06F 13/00* (2006.01)
*H04N 5/445* (2011.01)
*H04N 7/16* (2011.01)

(52) U.S. Cl.
CPC .. *H04N 5/44543* (2013.01); *H04N 2005/44556* (2013.01)

(58) Field of Classification Search
USPC .................................. 725/37, 45, 52, 53, 135
See application file for complete search history.

(56) References Cited

U.S. PATENT DOCUMENTS

| | | | | |
|---|---|---|---|---|
| 7,055,166 | B1* | 5/2006 | Logan | H04H 20/14 715/719 |
| 7,683,937 | B1* | 3/2010 | Blumenfeld | H04N 5/23203 348/211.11 |
| 7,855,638 | B2* | 12/2010 | Huston | A63B 24/0021 340/539.13 |
| 8,027,568 | B1* | 9/2011 | Abecassis | 386/353 |
| 8,132,200 | B1* | 3/2012 | Karam | G06F 17/30846 725/13 |
| 8,484,679 | B1* | 7/2013 | Chtchedrina et al. | 725/42 |
| 2007/0022446 | A1* | 1/2007 | Arseneau | G06F 1/1626 725/74 |
| 2008/0231595 | A1* | 9/2008 | Krantz | H04N 7/163 345/156 |
| 2009/0047004 | A1* | 2/2009 | Johnson | G11B 27/10 386/224 |
| 2009/0083787 | A1* | 3/2009 | Morris | H04N 5/44543 725/32 |
| 2010/0005485 | A1* | 1/2010 | Tian et al. | 725/32 |
| 2010/0070992 | A1* | 3/2010 | Morris et al. | 725/32 |
| 2010/0077441 | A1* | 3/2010 | Thomas | G06F 3/1415 725/133 |
| 2010/0131996 | A1* | 5/2010 | Gauld | H04N 21/47202 725/100 |
| 2010/0289900 | A1* | 11/2010 | Ortiz | H04N 5/232 348/159 |
| 2012/0113264 | A1* | 5/2012 | Moshrefi | H04H 20/38 348/157 |

\* cited by examiner

*Primary Examiner* — Pinkal R Chokshi
*Assistant Examiner* — Alexander Gee
(74) *Attorney, Agent, or Firm* — Caesar Rivise, PC

(57) ABSTRACT

A user/viewer directed film entertainment system preferably includes computer hardware, software, on-line content and audio/video media that allows the user to watch a story unfold in a nonlinear fashion according to the desires of the user and preferably from various points of view. The system provides a story broken up by a plot related category (e.g., characters) into story segments. These segments tell the story from the vantage point of these characters, each having their own storyline within the main story. Each character's storyline may or may not intersect with other storylines. While the user can watch a chosen character's story segments straight through and likely understand enough to allow the user to reveal the end, the user may miss important information contained in other characters' storyline that adds to the chosen character's story. The user can choose any order and any character as desired.

8 Claims, 6 Drawing Sheets

JUMP VIEW INTERACTIVE VIDEO SYSTEM

BACKGROUND OF THE INVENTION

1. Field of Invention

This invention relates generally to video entertainment, and more particularly, to a user interactive video allocation entertainment system.

2. Description of Related Art

Video stories (e.g., motion pictures, movies, films, videos, etc.) are seen and enjoyed daily by people worldwide. Typically these video stories are shown on communication terminals such as televisions, computers, smart phones, monitors, viewing systems including a display and speakers, in an order from a beginning of the story to an end of the story as desired by an originator (e.g., author, director, producer, etc) of the video story. Even if a story shifts back and forth along a timeline, the story still flows from its start to its end along a path preselected by an originator for viewing by others. It would be advantageous to give viewers the ability to decide how they watch video stories or videos. It would be further advantageous to allow viewers to select the scenes and order of the scenes desired for viewing based on criteria central to the story, such as based on characters of the story.

BRIEF SUMMARY OF THE INVENTION

In accordance with the preferred embodiments of the invention, an interactive video system, hereinafter also referred to as jump view system or video system, is a user/viewer directed film entertainment system preferably including computer hardware, software, on-line content and audio/video media that allows the user or viewer to unfold the story in a nonlinear fashion at his or her own pace and from various points of view. The video system transforms a general purpose computer or terminal to a special purpose terminal programmed to communicate on a customized platform for interacting with the viewer and operating the video system to provide the movie/story segments as directed by the user as will be discussed, for example, in greater detail below.

The Jump View system provides a story that is broken up by story subject-related categories, for example, by its characters into story segments. In a preferred example, video/story segments tell the story from the vantage point of these characters. In the story, main characters have their own storyline or story arc within the main story. The story timelines amongst the characters may or may not intersect. While a viewer can watch a chosen character's story segments straight through and likely understand enough to allow the viewer to reveal the end, the viewer may miss important information contained in other characters' story arc that adds to the chosen character's story. To maximize the entertainment value, stories can be viewed in various ways. A viewer can choose any order and any character that viewer would like. In other words, the viewer can jump from character to character and back and forth about the time line as desired. In other words, in order to understand an event that has occurred in one character's storyline, a viewer may want or need to refer to another character's storyline for clarification. While not being limited to a particular theory, at the end, all character stories preferably converge as the story unfolds into a single final episode.

The video system is also portable. That is, a viewer can play the video stories via the web, using a web browser or dedicated program from any device that may be capable of streaming video and audio content from the web, such as but not limited to, a PC, smart phone or tablet, web TV services, etc. The interactive video system is also operative via interactive services, for example, "On Demand" television services provided by cable, satellite and fiber optic service providers. Preferably, any given story available via the interactive video system may be accessible through one or at least any combination of the aforementioned options.

Through this video system a viewer is able to watch, for example, a couple video/story segments of a story at home on a television, then a few more during his or her commute to work on a smart phone. The viewer can then watch more segments on his or her PC at work, a few more on the smart phone on the way home form work and then even more once back home on the television.

Any future technology that allows for streaming or live delivery of video content can be incorporated into the video system. In another example, video stories can be housed on a DVD, Blue Ray disk, thumb drive or other portable memory and viewed via a video/story segment based interface and menu. In other examples of the invention, video stories may also be divided up by other story subject-related categories, such as, location, time period, event, prop or any other variable appropriate to the story.

In one aspect of the invention, a method for using a user-directed story entertainment system where a user watches or listens to parts of a story at a user terminal in plot related category-identifiable video/story segments based on the user's selections is disclosed. The method includes retrieving an electronic copy of a of a story having a plurality of plot related category-identifiable video/story segments located at a storage medium, with each plot related category-identifiable video/story segment associated with a category of the story, downloading packets of video data corresponding to a film start segment to the user terminal to play the film start segment at the user terminal, reading a user requested selection of one of the category-identifiable video/story segments of the story, downloading packets of video data corresponding to the selected category-identifiable video/story segment to the user terminal to play the downloaded video/story segment at the user terminal, reading a user requested second selection of a second one of the category-identifiable video/story segments of the story, downloading packets of video data corresponding to the second selected category-identifiable video/story segment to the user terminal to play the requested category-identifiable video/story segment at the user terminal, reading a user requested selection of a final episode end segment of the story, and downloading packets of video data corresponding to the selected final episode end segment to the user terminal to play the downloaded end segment at the user terminal. The disclosed the category-identifiable video/story segments may be based on characters, events, locations, or time periods.

A preferred example of the invention also includes authorizing the downloading of the packets of video data corresponding to the selected final episode end segment to the user terminal only upon prior downloading of a threshold amount of category-identifiable video/story segments to the user terminal. Another example of the invention includes determining if video/story segments of the story have previously been downloaded to the user terminal, and showing the film start segment if video/story segments of the story have not previously been downloaded to the user terminal.

In another aspect of the invention, a computer program product that includes instructions for the execution of the steps of the preferred method of the invention when the said program is executed by a computer is disclosed. In yet another aspect of the invention, a recording medium that can be read by a computer, on which is recorded a computer program that includes instructions for executing the steps of the preferred method is disclosed.

BRIEF DESCRIPTION OF SEVERAL VIEWS OF THE DRAWINGS

The invention will be described in conjunction with the following drawings in which like reference numerals designate like elements, and wherein.

DETAILED DESCRIPTION OF THE PREFERRED EMBODIMENTS

Figure 1:
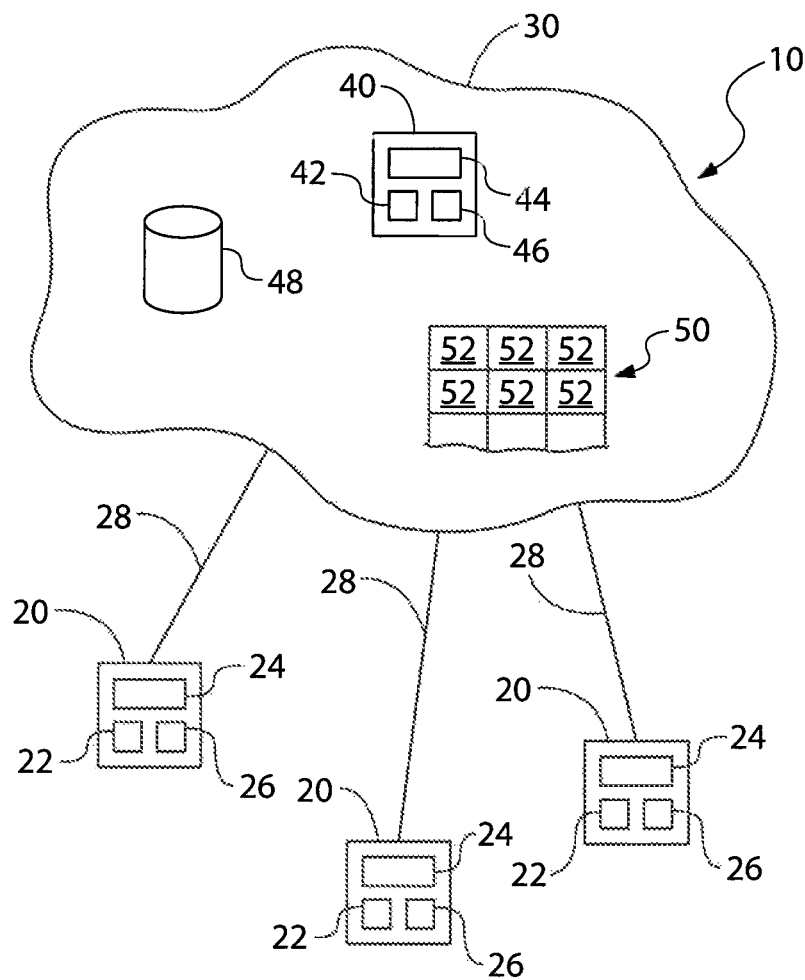
FIG. 1 is a block diagram of an exemplary data processing architecture which is used to implement the interactive video system of an exemplary embodiment of the invention.

Referring now in greater detail to the various figures of the application, wherein like-referenced characters refer to like parts, a general communication environment including an exemplary interactive video system 10 of the invention is illustrated in FIG. 1. FIG. 1 shows user terminals 20 for communicating with the interactive video system and receiving/viewing the video story, and a communication medium or network 30 for the communication and the transmission of video data. For example, it is possible that the communication medium 30 is a packet-switched network, preferably an IP based network, i.e., a communication network having a common layer three IP layer, such as the Internet. The user terminals 20 may preferably be computers or smart phones with modems to send and receive video data to/from the packet-switched network. The terminals 20 may be equipped with software suited to process video data.

In another embodiment, it is also possible that the communication medium 30 is a telecommunication system comprising circuit-switched telephony networks and packet-switched telephony networks, and that the user terminals 20 are mobile telecommunication terminals, e.g., cellular phones, capable to send/receive and replay video data. The circuit-switched networks may be, e.g., PSTN, ISDN, GSM, or UMTS networks (PSTN=Public Switched Telephone Network; ISDN=Integrated Services Digital Network; GSM=Global System for Mobile Communication; UMTS=Universal Mobile Telecommunication Services).

The user terminals 20 are video processing devices (e.g., televisions, computers, smart phones, monitors, viewing systems including a display and speakers), and usually have capabilities to communicate with the network 30 to receive and display video data including video stories 50. In the example of FIG. 1, user terminals 20 are video processing devices, with each device including a network interface 22, a control unit 24, and a memory 26. The user terminals 20 are connected via connections 28 to the communication medium 30. The connections 28 may be a wire-line connections or wireless connections.

While not being limited to a particular theory, the video stories are preferably stored on an interactive video processing unit 40, such as a video server, a video proxy or an independent storage medium 48 in communication with the video processing unit. The storage medium 48 and interactive video unit 40 are included within or accessible from the network 30, which preferably is a packet-switched network such as the Internet. The video processing unit 40 may include a control unit 44, a memory unit or storage medium 46, and a network interface or transceiver 42 for transmitting and receiving messages over the network 30.

The terminals 20 may send via the network 30 a video story request to the network interface 42 of the interactive video processing unit 40. The video processing unit 40 executes the interactive video system 10 as it is adapted for the special purpose of reading and processing the video request, retrieving the requested video story data from the storage medium 46 or from the independent storage medium 48, processing the video story data and initiating the transmission of the video story 50 to the terminal 20, preferably in packets of data corresponding to segments 52 of the story. In other words, the interactive video processing unit 40 is generally triggered manually by a user to execute the transfer of video data as a story 50 in an order selected by the user via story or video segments 52 of the story from the video processing unit via the network 30 and the connection 28 to the terminal 20. The video/story segments may have a NAAL structure, but the structure is not limited thereto, as long as the structure is configured for communication between the video processing unit 40 and the user terminals 20 via the storage medium 48 and the network 30, as would readily be understood by a skilled artisan.

The receiving terminal 20 receives the video data from the communication medium or network 30 via a connection 28 and the corresponding network interface 22 (e.g., modem, cable, telephone line, satellite dish, transceiver, etc.). The control unit 24 then processes the video data, and possibly stores the data in the memory 26 for subsequent display. It is also possible that the control unit sends the received video data directly to a display unit associated with the terminal 20 to show the video/story data segments.

The user terminals 20 and the video processing unit 40 include network interfaces 22, 42 having an electronic circuit, possibly with a radio part for wireless telecommunication, at least one microprocessor in the control unit 24, and application programs executed by the at least one microprocessor. Application programs executed by the user terminals may include an executable program, tool, or application that configures the terminal to communicate with the application program executed by the video processing unit 40 to operate the system. The terminals 20 preferably further include input and output units, for example a keypad, a microphone, a loudspeaker, and a display unit. The functionalities of the terminals 20 and the video processing unit 40 are performed by the interaction of the hardware and software components. The memory units 26, 46 of the terminals 20 and of the video processing unit 40 may be adapted to receive and store a computer program product, whereby the execution of the computer program product by the terminals 20 and of the video processing unit 40 is suited to provide the terminals and the video processing unit with additional functionalities to operate the interactive video system, as would readily be understood by a skilled artisan.

The video processing unit 40 of the network 30 may be implemented as one or more servers with a peer-to-peer and/or hierarchical architecture. Also, the functionalities of the video processing provided by the terminals 20 and the video processing unit 40, possibly in connection with the storage medium 48, may be realized as separate, independent units or in a de-centralized structure where the functionalities are provided by a plurality of interdependent de-centralized units.

Still referring to FIG. 1, the video story 50 includes video/story data segments 52 that are forwarded preferably from the storage medium 48 or memory 46 for transmission of the video data segments over the communication medium 30 to the requesting terminal 20. It is understood that the storage medium may include storage available to an independent provider of the story. The video/story segments 52 are each a compilation of data packets that together form a portion of the story, such as a predetermined section of the story related to a category relevant to the plot of the story (e.g., character, event, scene or predetermined variable of the story). These sections are preferably determined by an operator of the interactive video unit based on the characters, events, scenes, or other variable of the story's plot. While not limited to a particular length, the video/story segments 52 typically are about less than one minute to about 20 minutes long, and preferably are about 2 to 10 minutes long.

Figure 2:
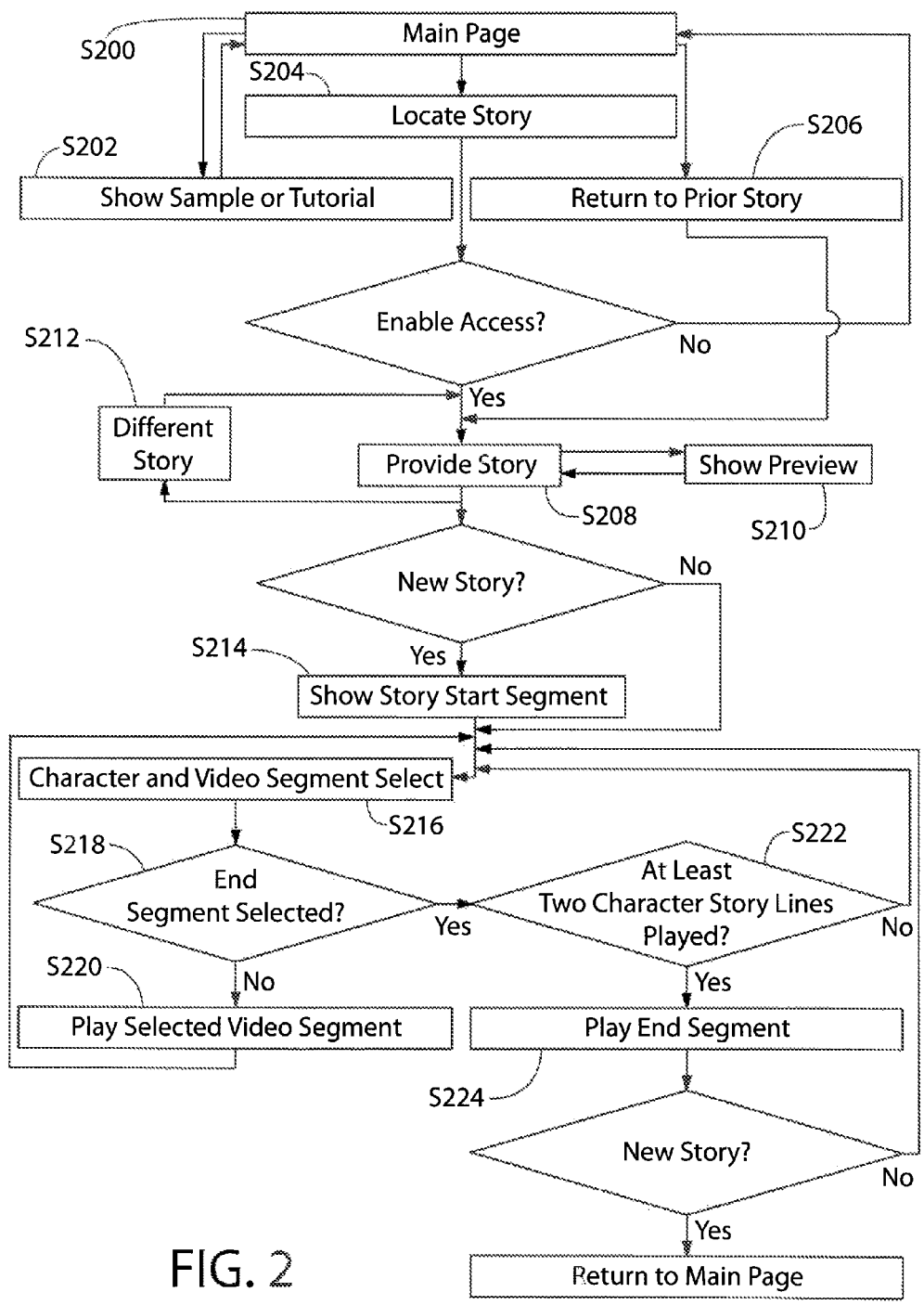
FIG. 2 is a flow chart illustrating exemplary steps for performing the video system in accordance with an exemplary embodiment of the invention.
Figure 3:
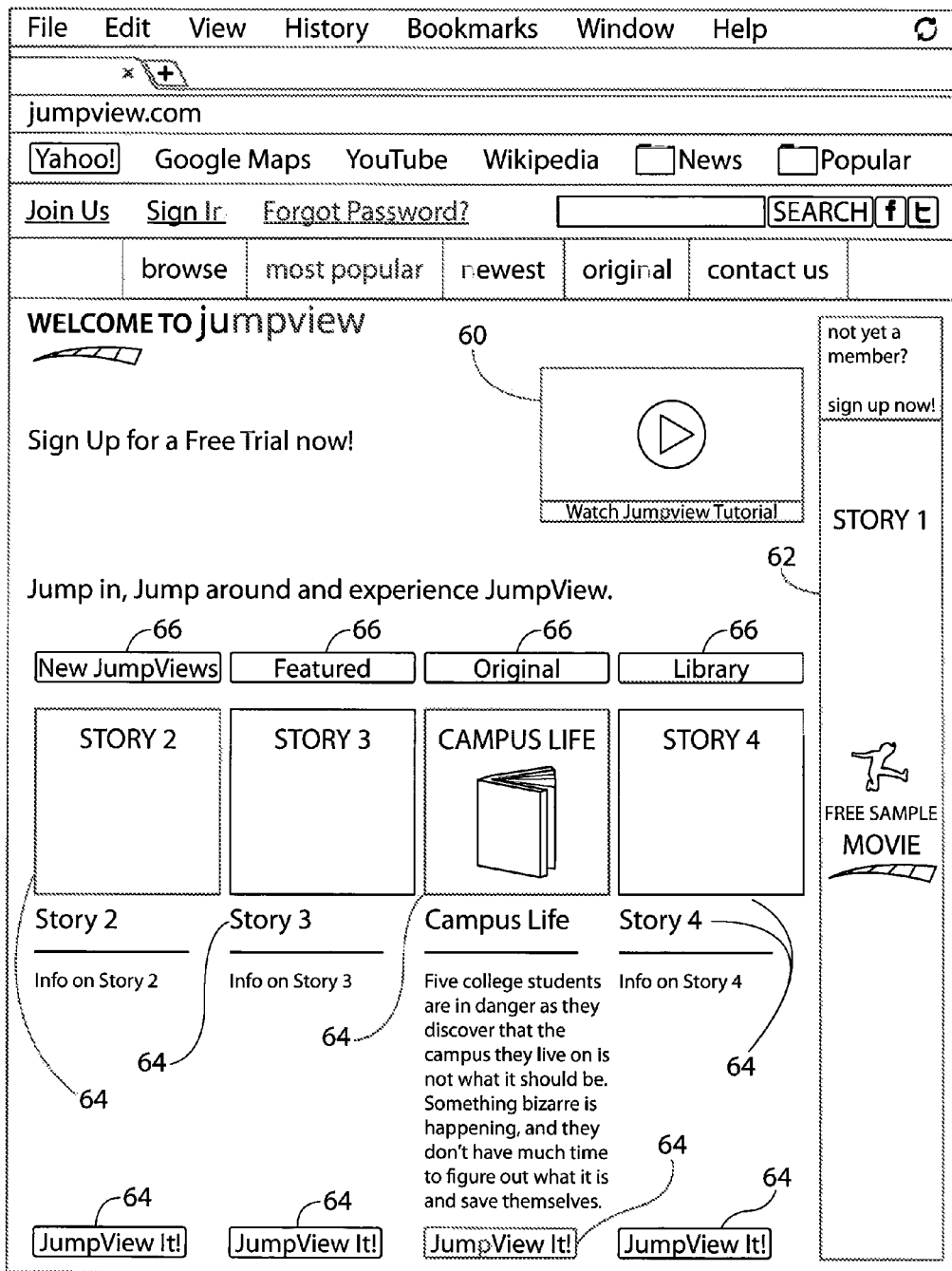
FIG. 3 is a schematic representation of a main page or screen of the interactive video system.

FIG. 2 shows an exemplary flow overview of an exemplary method of the interactive video system 10, hereinafter in this example also referred to as "JumpView". While not being limited to a particular theory, the interactive video system provides access and viewing of video stories, films or movies 50. Upon entry into a main page 58 of the system 10 illustrated for example in FIG. 3, a user or viewer has several options at Step S200 for proceeding, preferably by clicking on or selecting a appropriate icon or button on the main page 58. For example, the user can watch a tutorial 60 of the system or view samples 62 of available films at Step S202. The user can also locate a story 50 to get more information about the story by selecting an icon 64 corresponding to the story at Step S204. If the user wants to look for available stories not shown of the main page 58, the user can select other icons 66 (e.g., new stories, featured stories, original stories, library of stories) that can pull up the name of other stories available on the system. Further, the user can select to return to a story previously viewed by the user at Step S206. In order to gain complete access to the video stories, the user may be required to log into the system. If access is denied, the system returns to the main page 58.

Figure 4:
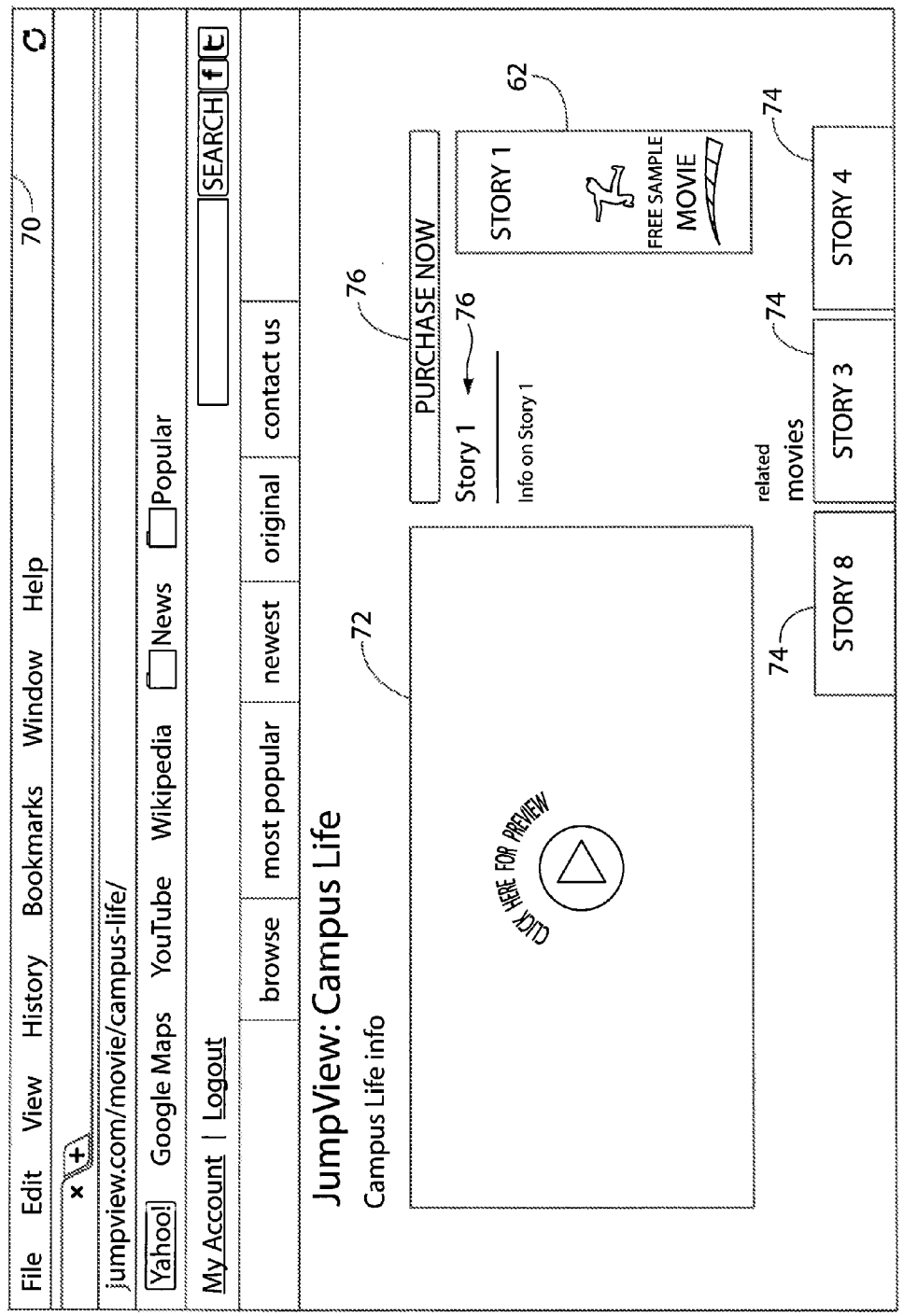
FIG. 4 is a schematic representation of a landing page or screen of the interactive video system.

Upon logging in, the system 10 displays a landing page 70 for providing the story at Step S208. FIG. 4 illustrates an exemplary landing page 70 that allows the user more options, including an option to view a preview 72 of the story at Step S210, access other stories 74 at Step S212, and continue with the selected story 50 at 76.

In a preferred embodiment, each story begins with a central story/movie introduction as a teaser or as a simple movie trailer-like preview. Therefore, if the selected story (e.g., "Campus Life") is new for the user as identified, preferably by at least one of the user's name and the IP address of the user terminal 20, then the video processing unit 40 forwards a film start segment 52 to the user's terminal at Step S214 for viewing by the user. If the selected story is a prior story released by the video processing unit 40 to the user, then the video processing unit does not require a re-showing of the film start segment.

Figure 5:
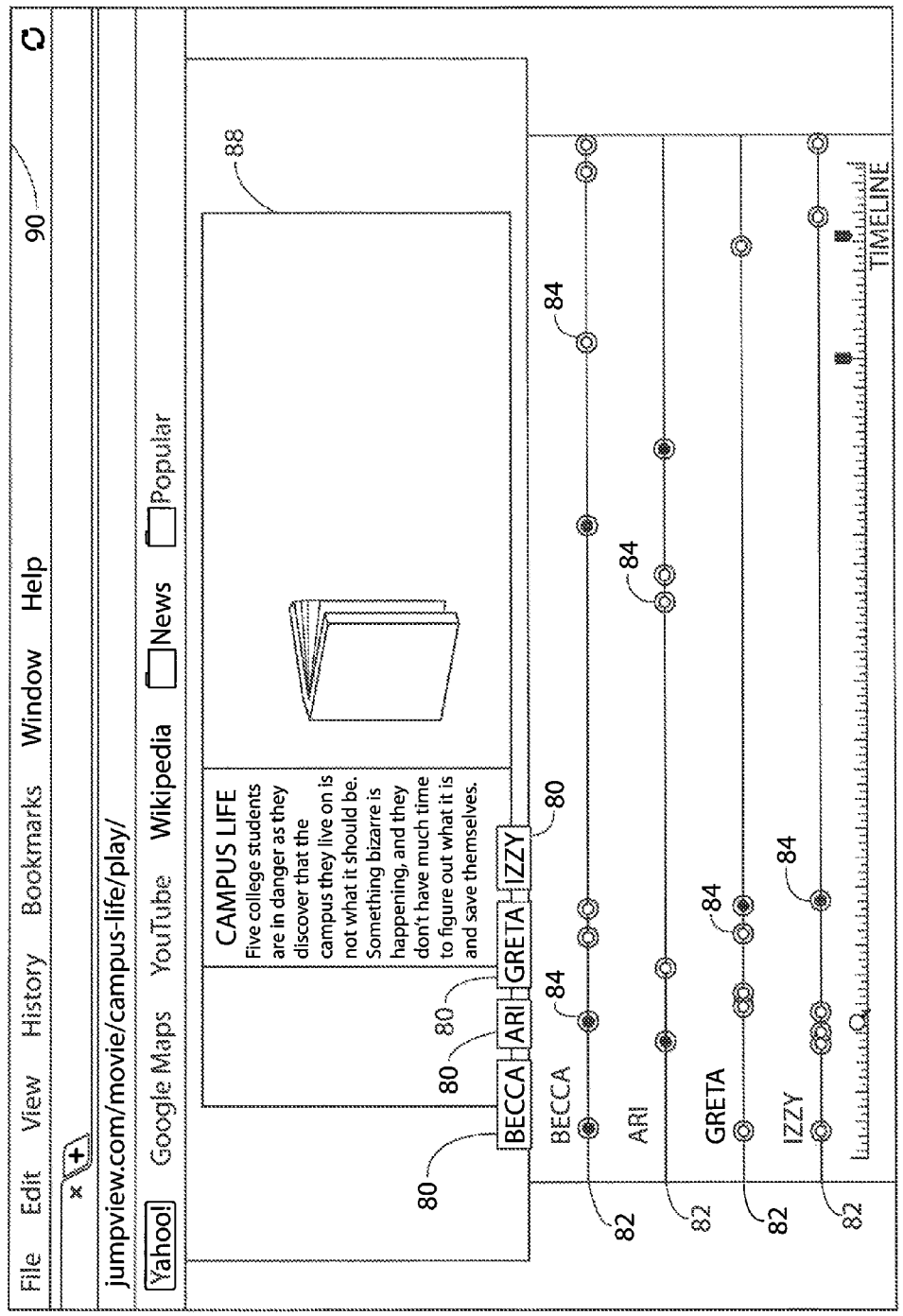
FIG. 5 is a schematic representation of a story menu page or screen of the interactive video system.
Figure 6:
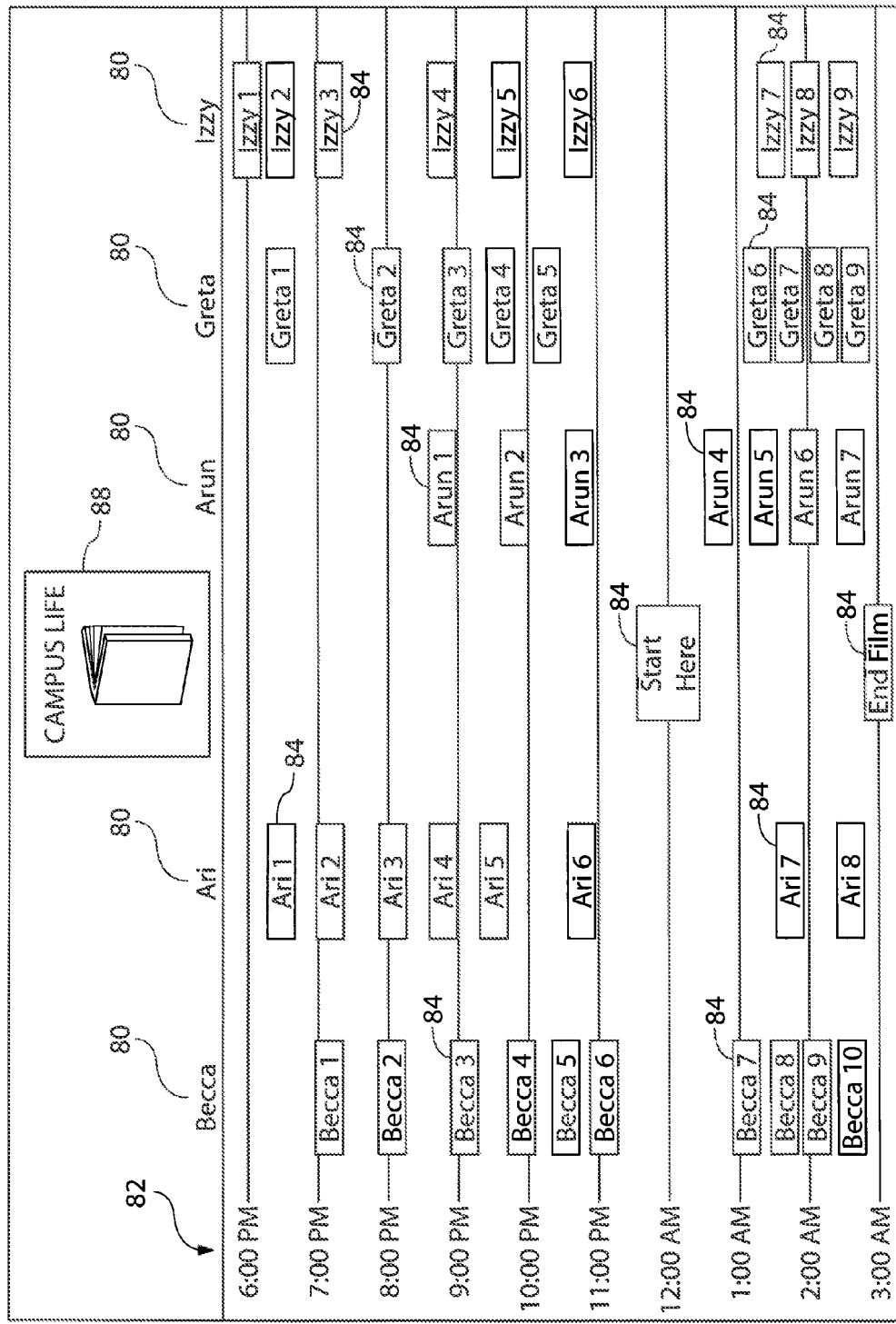
FIG. 6 is a schematic representation of another story menu page or screen of the interactive video system.

The video processing unit continues at Step S216 to a story menu page 90 (or plurality of pages) as needed to allow user selection of a character and character scene for viewing specific video/story segments 52. Examples of the story menu page 90 are depicted in FIGS. 5 and 6, which show characters 80 and a timeline 82 of the story 50. The timeline in FIG. 6 is listed in hours from 6:00 PM to 3:00 AM by example, but a timeline for any story is not limited to the exemplary timeline of FIG. 6 in time or units of time.

As can be seen in FIGS. 5 and 6, the story menu page 90 shows a plurality of segments identified by icons 84 for each listed character along the timeline of the story, with each segment representing a video/audio package of the story specific to that segment. In FIG. 5, the story menu page 90 shows the icons as an open or closed circle, with an open circle indicating that the video/story segment 52 corresponding to that icon has not been played by the user's terminal 20. Further, an icon can indicate that its corresponding video/story segment has been played by changing an appearance of the icon, such as, to a closed circle or to a different color.

The story menu page of FIG. 6 shows the icons by name (e.g., Izzy 1, Greta 1, Ari 1, Becca 1, Arun 1, Start Here, End Film, etc.) that may be modified, for example, by color, after the video/story segment 52 corresponding to that icon has been played. Accordingly, each segment may preferably be named with indicia of a specific character involved in that package, or with other indicia such as, for example, a traditional start or end point of the story or an event (e.g., wedding, funeral, train crash, dance, battle, etc) of the story. By example, FIG. 6 shows that a first segment "Start Here" is located within the story time sequence around midnight. While the final segment or episode is listed as "End Film", it is understood that this could correspond to the end of the story, or an end of a part of the story. Further, while FIG. 5 does not show start or end segments, it is understood that these segments are located on the story timeline outside the view of the portion of the timeline shown in the figure.

It is understood that the invention provides more features than discussed in this example. For example, selection of one of the characters at 80 of the story menu page 90 of FIG. 5 or 6 may modify the terminal 20 to display that specific character with the video/story segments related to that character alone on the timeline. Further, upon selection of a character or pre-selection of a video/story segment (for example by single clicking on a video/story segment icon instead of double clicking for playing that segment), the terminal 20 may be modified to provide a bio or picture of that character in a window 88 of the story menu page 90.

At Step 220, the system plays the user selected video/story segment. After each segment or "mini-movie" the viewer may have several options. For example, the user/viewer can select to jump to the next segment for the selected character, jump to a recommended segment of the store based on the previously viewed video/story segment, or return to the story menu page 90 to navigate the story lines at the viewer's discretion. Other options may be available, such as randomly jumping to another segment of the story, exiting the story to return to the main menu, or exiting the system.

While not being limited to a particular theory, the final episode preferably is locked. Accordingly, in this example of the preferred embodiments, upon selection of a video/story segment 52 at Step 216, the system 10 checks if the selected segment is the end segment at step S218. For access to view the end segment or final episode in this example, the terminal 20 must have played the segments of two or more characters completely through their timelines (Step S222). Other examples of criteria needed to unlock the end segment may include playing the entire story or playing a certain percentage of the story. After the end segment or final episode is unlocked and played at Step S224, the system may offer suggestions on which story to watch next based on the story or stories previously watched by the viewer. Of course the system gives the viewer the choice to opt out and choose another story as desired.

The video stories available in the video interactive system 10 are preferably provided via an on-screen interface associated with or included in the user terminal 20. This interface includes the story menu page 90 having a plurality of icons/buttons that are arranged generally by character in a timeline and that when pressed or clicked, cause the system to play the corresponding video/story segment 52 as an episode, chapter or portion of the video story. In this way, the viewer is enabled to choose which of the segments the viewer would like to see in the viewer's selected order. The user is able to access the video stories by logging in via a PC, smart phone, web TV, On Demand television service, etc., typically with a username and password.

It should be noted that the embodiments of the invention are not limited to video stories/film/movie use only, but include examples of audio use only for enjoyment while listening to a radio or other communication device that includes a speaker. Of course, in such examples, the video/story segments 52 are also considered audio segments. In all of the discussed examples, the video/story segments are considered story segments to encompass all video and audio segments. It is understood that the use of the term video/story segments actually covers video only segments, audio only segments and any combination of video and audio segments. Similarly, the term video is known to refer to audio-visual and any combination of audio and video.

Exemplary segments of the story "Campus Life" are described in greater detail below.

Start Here

We're at the Frat Party of the year. Elliot, a cocky, swaggering 20-something, is walking around with beer, throwing it on girl's shirts. "Wet T-Shirt party!" Cut to: Becca, a tightly wound 20 year old, watching Elliot suspiciously from the corner of the room. There is a slight tremor. One of the girls Elliot dumps a beer on is Izzy, a rather flamboyant well heeled young woman. Greta, who is standing with her, is gorgeous—like something off of a teenage boy's wall. She looks at Izzy's shirt and says "Cool", but then she thinks for a second, cringes and then frowns, "Ooooh. Not cool." Arun, a handsome, soft spoken Indian guy in his early 20's, rushes over to cover her up. He and Elliot have words. Elliot laughs at Arun and moves on. Izzy looks at Arun, and says "That's definitely better than a broken rose." She leads him over to a sofa. They kiss. She smiles. He takes her hand. I have to go now, she says. Me too, says Arun. Let's hook up later. Arun nods. She and Arun slump back in the chair slightly limp. Do nothing. But their hands are still touching. They come out of their stupor, look at their hands. They are both amazed by the sensation. They rub their hands over their own lips and stare at each other. Ari, a good looking, cocky and energetic 21 year old is walking down the hallway towards the sound of the party. His cell phone rings. He has to pull out two before he discovers the third one that's ringing. We can immediately tell the person on the other line is upset. Ari sys, "You never got it? You have to be kidding me. I'll take care of it. I promise." Inside, Elliott grabs other people's drinks, slams them back, etc. He turns to see Ari right next to him. Ari pushes him and says, "What is your problem? You promised to return it." Elliot says, "sue me". Then there is another tremor. That freaks Elliot out and he runs away. Ari yells, "come back here!' He follows him. Cut to: Bathroom. Becca's in there. Elliot barges in, sweating/nervous. "Help me!" There is a big tremor. Elliot's eyes grow wide. Cut Back to: Outside the door, Ari bursts in. Elliot's gone. Becca emerges from the stall. Peers about and says to Ari "I have to thank you again. You keep saving me". Ari doesn't know what she's talking about. "Elliot," she says. "You got rid of him for me." Ari looks at her, "I didn't get rid of him. I just followed him in. I was two seconds behind him." "Then where is he?" she asks. "Elliot!" Ari calls. "Stop hiding!" They start examining the room. The stalls, etc. No sign of him. CUT TO: The main party room. Ari and Becca start asking around if anyone has seen Elliot. He just disappeared. One of the girls who he wet t-shirted yells out, "Hey Everyone! They finally got the bastard. Elliot's gone!" Everybody cheers. Becca tries to find out what they mean. The girl turns to her and says, "What's your problem? Didn't he annoy you too?" Becca finds Izzy and Arun—"something crazy is going on here."

Becca 1

Becca "wakes up" in front of a tree. She looks around seemingly confused by her surroundings then touches her hand to the tree and is amazed by the feeling. Then she notices people are chanting "save our park!" A construction vehicle's claw swings at her. She ducks just in time. Everyone else casually moves aside. She's freaking out that they almost got hit. Everybody else isn't overly concerned. They mutter, "oh well we tried. Sometimes you can't get around these things. They make it impossible". She doesn't understand how everyone else can be so blasé about it. They shrug. "Who's up for pizzas?!" Yeah! They all head off, leaving Becca bemused. She sees a group of college kids playing ultimate frisbee. They jump super high to catch the frisbee. She turns around and sees Ari's body land across the street.

Becca 2

Becca sees Ari fall to the ground. She runs over and tries to help him, but he doesn't respond at all. She takes out her cell phone—no service. She looks over to a woman standing at the corner nearby. She yells for the woman to help her—call 9-1-1! But the woman does nothing. No motion, no response. Becca is upset. Really upset. She doesn't know what to do. Tears well in her eyes. She looks around for someone else to help, but there's no one. She's really freaked out now. Tears fall from her face. A single tear falls onto Ari's face. Ari slowly flutter's his eyes and wakes up. She tells him not to move and he's like, "no, really . . . I'm fine. He sits up, looks around, confused. She insists on taking him to the hospital. Cut To: The hospital. The Doctor checks out Ari. Nothing wrong. Becca notices that no blood appears they poke him with an I.V. She sees a surgical scalpel in a tray on the counter. She looks at it, then at Ari. And when the Doctor leaves, Becca grabs the scalpel and drives it down into Ari's hand. He screams in pain, but has no cut or blood from it. What the hell! Ari's phone rings. He takes the call. Uh-oh. He pulls out the IV and splits. Becca sits back, befuddled. "What the hell is going on?"

Becca 3

Becca arrives at her dorm room. Izzy is there rushing to get ready for her date with Arun. She's frustrated by her outfit combination. Becca explains what just occurred. Izzy says, that's pretty cool. Cool? I wouldn't exactly call it cool. It's more weird, don't you think? She's not really interested with what Becca's getting at. She sighs at herself. It'll have to do. She dismisses Becca with a: "Sounds great. I gotta run." Cut to: Becca in the library. She's researching people who survive falls without getting hurt. She gets up from the table and heads back into one of the aisles. Out of nowhere, Elliott attacks her . . . .

Becca 4

Elliott is attacking Becca. She can't fight him off. Security comes and stops him. Warns that he'll be kicked out. Elliott shrugs. He heads out, but as he goes, he flicks his tongue lasciviously at Rebecca. Outside, Becca leaves the library and arrives at her room. She takes out her key and opens the locked door. Seated on her bed is Elliott . . . .

Becca 5

Becca uses her key and enters her room. Elliott is seated on her bed, sniffing a pair of her undies. She's freaked—"How did you get in here?" He tells her she doesn't lock her door. She looks at what he's doing and is repulsed. "Want to smell mine?" he offers. She turns to escape, but he grabs her and throws her down onto the bed. Before anything bad can happen, Ari comes into the room. He rushes Elliot. Becca watches as they fight. Ari pushes Elliott out to the balcony and to the edge. He's about to shove him over. "Let's see what happens when you hit the ground." Elliot has no problem with that. Go ahead . . . .

Becca 6

Becca says thank you to Ari for getting rid of Elliot. Ari tells Becca about what happened at the club and how he didn't get hurt by the bottle. Becca notes that Elliot got into her room without having a key. Wonders what Ari and Elliot have in common. Are you guys from the same place or something? Ari doesn't think so. Becca decides that they have to look into their connection. Cut to: the Admin building. They look for student records, and discover that there are no student records . . . for anyone!

Becca 7

Becca is freaked out. Something weird is going on here! Ari has to agree. Izzy and Arun are like, "what are you talking about? The guy tricked you. He's just hiding somewhere." Becca insists that's not true. Ari agrees. Says there's no way Elliot could have gotten out of the bathroom without him seeing. Becca is adamant, "Something's not normal and I'll prove it." Cut to: Stairwell. Greta slides in just in time to witness Becca grabbing Ari, and shoving him down the stairs. Everyone gasps as he falls down and down, twisting his neck every which way. When he reaches the bottom, he stands up, unharmed. Ari yells up, "See. Not a scratch." Arun is like, "oh my god, he's superhuman." Becca looks at them and says "I don't think it's just about him." Then she charges into the rest of them, and pushes them all down the stairs. They fall and crash, but are fine. They scream at her, "Are you nuts!?!" She says, "I told you something's weird here." They say, "well what about you?" Becca pauses, then jumps off the stairs . . . . "

Becca 8

Becca jumps from the top of the stairs and smashes into the rest of the gang in a heap at the bottom. Greta immediately says, "It's awesome we can do these things. Just when I thought this place was a complete dud." She heads out. "Where are you going?" Izzy yells to her. "I'm going to find out what else I can do," Greta answers as she heads out the door. Becca tells the others to forget about Greta. They have to figure out what's up. Becca looks over at Izzy and Arun arguing with each other. "C'mon you two, there's no time for that. We need to figure this out." Becca makes the executive decision that Becca and Ari will check with the doctors at the infirmary and Arun and Izzy will go to campus security to report that Elliot's missing and to see if anyone else has gone missing. Becca and Ari split. Izzy and Arun look at each other and frown. Outside, as Arun and Izzy exit the building, they are immediately confronted by the Freedom Group . . . .

Becca 9

Becca and Ari are in the Dr's office asking him if he knows what's going on. He has nothing but stock answers for them. Frustrated, they leave. As they do, Security Guards grab them and roughly drag them outside. The Security Guards ask if they are memory residents. Ari and Becca have no idea what they're talking about. "Are you polymorphic?" they ask. Becca and Ari are like, "What? We're just trying to figure out what's going on around here. Someone we know disappeared and there's been other weird stuff." Before they can launch into a description, the Guards insist that they identify themselves. Becca and Ari give their names. The Guards take that as a belligerent response. They ask Becca if she is "Melissa". She tells them she just said her name was Becca. The Guards pick up their radios and signal central command. These two need to be eliminated . . . .

Becca 10

One of the Guards says the Ari and Becca need to be eliminated. Becca's like, "Eliminated?! What the hell are you talking about?" The Guards go to grab them, but Ari and Becca slip out of the way and run. They start to feel tremors all around them. "What's that?" Before they have to figure it out, the guards are right on them. They duck into a side room. No way out but a window. They look at each other, nod and jump through it. They crash to the ground. In a moment, they're up and running Her heart is pounding. "What the hell is happening? What do they mean eliminated?" "I think they mean they want to kill us," Ari offers. Becca's head is spinning, "Why? Why would someone want to kill us? All we did was start asking them questions about . . . " "Maybe that's the problem," Ari says. "Maybe we're not supposed to ask." Becca looks at him, "Why? What's the secret they're hiding from us?" Ari isn't sure. He posits that maybe the whole campus is some kind of Rosemary's Baby place. Becca agrees there must be some sort of conspiracy. Becca grabs his arm, "We need to get out of this place." Ari says he'll call his parents to come get them. He takes out his cell phone and is about to dial, but pauses. He can't remember his parents' number. "Call information," Becca offers. "I don't know their names." is his reply. We have to get to Izzy and Arun and figure out how to escape, she says. They race across campus. Arun smashes into Ari as he turns the corner. Becca and Ari stop him. "Where are you going? Where's Izzy?" Arun grabs Ari by the shirt. "These guys just disappeared! We need to get out of here!" Ari is shocked. Becca screams at him, "Where's Izzy?" Arun points back to where he came from. "Come on!" Ari and Becca start to run off. "You coming or what?" Becca yells to Arun. Arun hesitates, then decides to join them. The three get back in time to see Greta getting run over by a bus. From the far side of the street, they see Izzy run to Greta. There are tremors. They all watch in horror as Greta shakes with tremors, then disappears completely!

Ari 1

Ari, nicely dressed in business attire, is on a cell phone in his dorm room/office. He is attempting to calm a customer who is freaking out. Another phone rings. He pulls out a second cell phone and answers it. Ari addresses the person who is videotaping him for his "Apprentice" application. He hears the continued barking from the first cell phone and attends to it. Ok, ok, he says. I'll take care of it right now. Angry, he has to tell his videographer to wait and hangs up on the second cell as he rushes out the door. Cut to: Ari in a storage room. It's empty. He spies something on the ground. He starts to see the . . . .

Ari 2

Ari storms into Elliot's room. Elliot is lounging in a hot tub with a couple of girls. Ari is floored. He throws the object he found at the storage room at Elliot. It lands in the hot tub. "You sold all our clients items so you could buy a hot tub!?" Elliot is like, "of course not. Check out my five new Plasma TV's. Now I can watch all the NFL games at once. He motions to the room which is packed with multiple TV's, CD systems and a sparkling disco ball. Ari is furious. I was building a business you a-hole and you've ruined it." Ari shakes his head in disbelief, then gathers himself and re-sets. "I can buy everything else back myself except the ring," he reasons. "That's more than I have. By the looks of it, you haven't sold it. Let me have it." Elliot professes he doesn't have it, but his eyes give it away as Ari follows them to an end table. There's the ring. Elliot jumps up out of the water in his tight speedo as Ari races to it. Elliot gets there first, trips up Ari and races out of the door. Outside room, Ari follows Elliot up the stairs and to the roof Elliott jumps rooftop. Ari follows, but misses. He slams into the side of the building and hangs onto the roofs edge with his fingertips. Elliott steps on Ari's hand. Ari falls . . . .

Ari 3

Ari falls and smacks into the ground. He lies there motionless. Becca runs from across the street and drops to his side, trying to rouse him. Nothing. She tries her phone, but it's dead. She screams at people around, but no one helps. She's upset. A tear drop falls from her eye down onto Ari's face. And he twitches. He flutters awake. Becca is relieved. Tells him not to move . . . but he sits up. He's fine. They can't understand it—how can he fall 13 stories and be fine? He touches his wet face then rubs his fingers together, feeling the tear drop in his hand. He is amazed by the sensation. He looks around at everything as if he's seeing it for the first time. She takes him to hospital. He checks out fine. She's suspicious—so grabs a scalpel and stabs him in the hand!

Ari 4

Becca stabs Ari in the hand with a scalpel. It hurts like hell. Is she crazy? But she motions to his hand—it's not bleeding. He starts to consider this, then his cell phone rings. He pulls out the first phone. Not it. Second phone. Not it. It's the third one. He answers. Problem. Tells Becca he can't deal with this now. Takes off She yells after him that they have to figure this out. Tells him to stop by her room at the Weinstein dorms. Cut To: Ari going into a club through it's backstage entrance. He runs through the back area and out onto the stage where he finds Arun. And that's when 200 hundred angry black people attack him . . . .

Ari 5

Ari and Arun are being pummeled by the angry mob. Ari is smashed over the head with a bottle. Still, Ari manages to pull himself and Arun out of the race riot. They escape into the Alleyway and find a place to hide as the people spill out and disperse. When it's safe, Arun screams at him—"I told you so! This is stupid. I don't know how I talked me into this". Ari looks at him. Beat. "I don't know how I did either". Arun leaves in disgust. Cut to: Ari walking back into the men's room to clean up. He feels that there's a piece of broken glass in his scalp. He pulls it out. It hurts, but there's no blood. Nothing. He looks at the piece of glass—not blood on it either. He runs his hand over the spot on his head—no blood. He bends to look at his scalp in the mirror. No wound. No mark whatsoever. Ari looks at his reflection . . . . "What am I?" . . . .

Ari 6

Ari arrives at Becca's dorm room. He sees Elliot attacking Becca from the doorway and rushes to him. They start to fight. Ari pushes Elliott out to the balcony and to the edge. He's about to shove him over. "Let's see what happens when you hit the ground." Elliot has no problem with that. Go ahead. Ari gets disgusted and releases Elliot. You know what? I'll just go to security. Let them take care of you. Elliot starts to worry. "Whoa, whoa, whoa. Ok, ok. I'll give it back. I promise." Ari looks at him, "When?" "Right now." Elliot says, then heads out of the room—but not without saying something smart-ass to Becca.

Ari 7

At the infirmary, Ari and Becca are in the Dr's office. They want to know what it is about this place that can allow all this weird stuff to happen. The Doctor has a vanilla reaction to what they're telling him. Becca says, "We just threw ourselves down 10 flights of stairs and walked away from it." The Dr.'s like, "Okay, uh huh." He's just strangely disconnected from the whole conversation. He gives them stock Dr. answers to every comment or question. It's like he's not even listening to them. "Well, take a couple of aspirin and call me tomorrow.", etc. They get nowhere with him. And when they leave his office, two Security Guards grab them . . . .

Ari 8

Two Security Guards move towards Ari and Becca. Ari sees an opportunity and manages to pull down a large hospital cart in front of the Guards. He grabs Becca's hand and they run. The Guards get up and chase them. As Ari and Becca run from the guards, they start to feel tremors all around them. What's that? Before they have to figure it out, the guards are right on them. The two duck into a side room. No way out—except the window. Ari looks at Becca. She nods. Ari and Becca bust through and the two fall to the ground. Hurts like hell, but they're okay. They take off. Becca talks about how crazy this all is. Ari says he'll call his parents to come get them. He takes out his cell phone and is about to dial, but pauses. He can't remember his parents' number. "Call information," Becca offers. "I don't know their names." is his reply. He concentrates on trying to remember when grabs him. We have to get to Izzy and Arun and warn them about the Security Guards. They race across campus. Arun smashes into Ari as he turns the corner. "Where are you going? Where's Izzy?" Ari wants to know. Arun grabs Ari by the shirt. "These guys just disappeared! We need to get out of here!" Ari is shocked. Becca screams, "Where's Izzy?" Arun points back to where he came from. "Come on!" Ari and Becca start to run off. "You coming or what?" Becca yells to Arun. Arun hesitates, then decides to join them. The three get back in time to see Greta getting run over by a bus. From the far side of the street, they see Izzy run to Greta. There are tremors. They all watch in horror as Greta shakes with tremors, then disappears completely!

Arun 1

Ari Emcee is on the stage in a noisy club. He introduces a black rapper and Arun the "Indian Gansta". It's a rap battle. The black rapper launches into his routine. It's impressive. He finishes, stands back, arms crossed. Beat that. Arun goes for it and rips into a series of "urban" rhymes. They're horrible no matter what color he is, and being Indian makes it different. It seems offensive. When he's done, there's silence. We notice that the entire audience is black. They're offended and charge the stage . . . .

Arun 2

Arun is disheveled, seated with parents at the East End of the Campus Restaurant. His parents start off by mentioning that he should look more presentable—his future wife might not like sloppiness. Arun rips into them saying he's not going to marry that fat cow—that he can do whatever he wants. "I'm going to marry Izzy. And I'm going to propose to her tonight!" Suddenly their demeanor changes and they're like, "All right, sounds good dear." "And I'm dropping out of school to follow my music dream." Okay, they nod. "And you're going to keep paying for my dorm room until I can afford a place on my own". They nod in agreement again. He leaves. Cut To: Outside the campus dorms. Arun is hiding in the shadows, watching a girl walk through campus . . . .

Arun 3

Arun sneaks up to the girl he was watching from behind and is about to grab her, when she spins around and slaps him in the face. It's Izzy. She's pissed that Arun didn't show up at dinner like planned. Arun says he had to have dinner with his parents and couldn't get in touch with her. He hands her a rose with a broken stem. He tries to make it all better, but she's slow to come around. He's like, "I'm sorry. Sometimes real life interferes." Then Greta walks up and starts feeling Izzy's ass. Arun is shocked. The two girls kiss. Arun is pissed. Izzy walks away with Greta. "Maybe next time you won't stand me up." He pleads with her: "how can I fix this?" She tells him it'll take more than a broken rose. "Shit . . . "

Arun 4

Arun and Izzy are on the couch, each sort of feeling the sensation of their hands, etc. One of the party goers comes up to Arun and says, "C'mon dude, time to give us a song." He hands Arun a guitar. Arun takes it and is unsure. The other party-goers encourage him. Izzy smiles at him and nods. So Arun takes the guitar and strums a few chords . . . and sings the absolute most god-awful song you ever heard. The party-goers cheer. "That's awesome." "You kill it every time," etc. Arun turns to Izzy, beaming, feeling good. And she's like, "wow, you're really horrible." Arun is startled. "What?! But you always loved my music." Izzy says, "I know, but I have no idea why that is, because you are horrendous. I mean really, really bad." Arun is really uncomfortable. "Okay, Izzy, I get it." Izzy starts to add on to her point, when Becca comes over, upset and grabs Izzy's arm." Becca tells her—"Something really weird is going on here."

Arun 5

Arun and Izzy are piled up in the tangle of bodies at the bottom of the stairs. Arun struggles and manages to get himself up. Izzy holds out her hand for him to help. He looks at it. I don't think I have enough talent to help you up, he huffs and starts to walk away. She gets herself up. What the hell's your problem? What's my problem? What's your problem? All of a sudden you take my dreams and shred them in front of me in a matter of seconds, Arun yells. Ok, I'm sorry. No you're not. Izzy considers. You're right, I'm not. Arun looks at her. Who are you?

Arun 6

Arun steps out of the frat building with Izzy. There's a tremor as he watches exchange between Izzy and Freedom Group. He gets upset when he hears Izzy's keeping a secret from him. He wants to know what it is. She has no idea what the Freedom Group is talking about. Oh, ok. So now you're keeping secrets from me already. How's that for a basis for a relationship? Blah, blah, blah. The tremor hits heavy. Arun and Izzy hear the Freedom Group shouting and turn to see them disappear.

Arun 7

Arun and Izzy, frightened, back away from where the Freedom Group guys just disappeared. "What the hell was that?" Arun is completely freaking out—sweat poring form his brow. Arun frantically looks around for the source of what could have caused what they just saw. There's nothing. Arun can't take it. He turns and runs. He can hear Izzy yell something to him, but he can't make it out—he's all about getting the hell out of there. He's so frantic as he runs that he has to screech to a halt to avoid getting hit by a passing bus. Once it's past, he runs at full sprint again. He looks over his shoulder to make sure nothing is following him. Frantic. And BOOM! He crashes into Ari.

Greta 1

Greta is in women's locker room shower, checking herself and everyone else out. The other girls notice her stares and they understandably get angry with her. A Security Guard suddenly comes into the shower. He admonishes that this is inappropriate behavior. You get one more warning and then you're done. He leaves without a glance at any of the other women. Greta frowns. We Cut To: Greta in a Club, chugging beers, doing shots. She saunters up to Izzy and throws up on her. Livid, Izzy threatens to report her, but Greta pleads for Izzy not to as she fumbles and fails in her attempt to help clean Izzy up. Why shouldn't I report you?, Izzy asks. You know the rules. Izzy exhales and looks sheepish. Can I tell you a secret? Greta 2

They're in a diner. Izzy is wearing the same clothes, but is completely Spic and Span clean. Greta pleads for Izzy not to tell. Izzy decides she won't because she understands. Since you understand will you help me, Greta asks? No. Just because I get it, I'm not risking my place in here for you. I have too much at stake, Izzy says. Well how can I do it without getting caught? Greta asks. Izzy thinks, then offers: find someone who doesn't belong to anybody. How would I know that, Greta asks? It's easy, Izzy smiles, then points to waitress. Try her.

Greta 3

The diner. Last person leaves. Greta walks up to the counter and sits in front of the waitress. She starts coming on to her. Waitress gives stock waitress answers to everything Greta says. Greta gets frustrated. Screw it. She leans across the counter, grabs the Waitress and starts making out with her. Greta gets no response at all in return. She pulls away. Waitress says, "You want cream or sugar with that?" Suddenly Campus Police rush in. "Hey you! Stop where you are!"

Greta 4

Still in the diner, Greta sees Campus Security approaching. "Stop where you are!" She runs through the kitchen and out the back. We launch into a chase scene. It ends with her surrounded by campus security. That type of behavior isn't allowed here, they scold her. Ok, ok. I'm sorry. I won't do it again. "Next time, you're done!"

Greta 5

Greta and Izzy are walking along campus. Greta says it's not working. You may have to find yourself a Dyke, Izzy suggests. Greta likes this idea, but then frowns. You don't think she'll be suspicious when she tries to have a conversation? Arun isn't suspicious of me, Izzy replies. Speaking of which, he was supposed to me two hours ago. I'm so pissed. I may have to go shopping. She looks Greta over. And you're going to need to come with me if you want to succeed in any way. You look ridiculous—like a walking f-me machine. Yeah, I know. That's what I'm going for, Greta smiles. Izzy insists she come along and Greta says no way is she shopping for girl's clothes. Izzy says fine. See you later. As Greta moves away, she hears Izzy and Arun fighting. She smiles. I could have some fun with this and not get in trouble.

Greta 6

Greta is completely disinterested in the drama surrounding Elliot. She's looking around, frowning. This place is really starting to suck, she mutters. I can't do anything fun. I might as well be home watching my dad's porn. She sees security coming towards her. Oh, oh. Did I say too much? She ducks down and watches with relief as they pass by her and attend to someone else. Whew! Better get out of here just in case. She slides out into the hallway. She enters the stairway, just in time to see Becca push Ari down the stairs. And before she can stop her, Becca pushes her down too . . . .

Greta 7

Greta sees Becca jump from the stairs and crash her way down. Greta yells that it's awesome! I had no idea you could do that stuff. Becca lands on top of the rest of them. But she's okay! Greta steals this opportunity to lift Becca's shirt and peek at her chest. Becca's like, "what are you doing?" Greta: "just checking to see if you're okay. Anybody else need a check? But not the dudes." Becca's laser focused on what's going on. She explains to Greta, Izzy and Arun all that's gone on—Ari falling, the scalpel in the hand, Elliot getting in her room without a key, Ari's bottle in the head, no student records of any kind, Elliot disappearing. And now they're all able to fall without getting hurt. It's something about this place. Greta's like, "this is awesome, we can do all these things. Now this place has some possibility. I wonder what else we can do." Becca's tells her this is serious, something's not right. Greta is serious too, serious about finding out what her super skills are . . . .

Greta 8

Greta runs out into campus and starts to put herself through all kinds of funny tests —impaling herself on a fence, letting rabid squirrels bite her, etc. After a bunch of funny incidents, she positions herself on the street right in the path of an oncoming bus. Big smile on her face. Greta looks over and sees Izzy wide-eyed, racing towards her, yelling "nooooo!". Greta smiles. Check this out, Iz! And she's mowed down by the bus. Izzy gets there too late. Bus keeps rolling. Doesn't stop. Izzy bends down to check on Greta, really upset now. But Greta pops right back up, all smiles. You gotta try is! What a rush! There is sudden tremor. Greta's eyes go wide . . . .

Greta 9

Greta looks at the shaking all around her. Damn! she says. Wonder if I can get my money back. And she disappears . . . .

Izzy 1

Izzy stands of front of her dorm room full length mirror, modeling some clothes for herself. She hears weird rustling noises. Creepy, scary. Slowly moves to window. Arun, wearing a warm smile, is there. He starts singing songs. Even though the song is painfully bad, Izzy thinks it's wonderful. CUT TO: Izzy and Arun walking through campus, arm in arm. They encounter a group of thuggish looking boys called the Freedom Group assailing passers by like Hari Krishna's at the airport. Come on join us, they shout. No bureaucracy, no administrators, no campus security keeping us from doing what we want to do. One of the members makes eye contact with Izzy. Uncomfortable, she pulls Arun along, quickly past them. Arun drops Izzy back to her room. She goes in, sees note on her pillow. "We Know".

Izzy 2

Izzy walks into a Frat type building. Witnesses Elliot agreeing to join the Freedom Group. We need you to help get more people, they tell him. I'm not really big on that. I'm just here to have fun, he counters. Well that fun isn't going to last unless you help us. We need a dozen people to join us and we're there. Ok, ok. I'll work on it, he half heartedly says, leaving. He brushes past Izzy. He turns to the group. Here's one! See I'm helping already. He smirks as he walks out. Izzy walks up to them and tells them to stop stalking her. We've been through this already. I already said there's no way I'm joining and you said ok. Things have changed, one of the Group says. We've run out of recruits so we need you. Too bad, she says and turns to leave. Well, you're joining us whether you like it or not. She turns back, defiant. Really? And how's that? The member smirks. Because we know what you are and I don't think you want a certain someone finding out. Izzy's face drops.

Izzy 3

Still at the Freedom Group's building. We'll give you 24 hours to decide, they tell her. Upset, she leaves. Cut to: Izzy at a bar, sitting alone, chugging down drinks She's trying to talk to the bartender for some advice, but he gives stock responses to what she's saying. "Another drink?" "Thanks for the tip." Finally she decides to hell with it and calls Arun. She tells him she needs to see him for dinner. Hangs up. Greta stumbles over to her and hurls all over her.

Izzy 4

Izzy is with Greta in the diner. They are drinking coffees. Izzy's dress is sparkling clean. No trace of any vomit. She suggests to Greta that she go for the waitress. Then she adds, "It'll definitely be easier than what I'm going through." She explains to Greta that she loves this guy Arun, but that he doesn't know the truth about her. And that the Freedom Group has somehow found out, and they're threatening to tell him. Arun is such a great guy—he writes songs for me, he's so unique and caring—I didn't come here to necessary meet anyone, but now that's it happened I don't want to blow it. Greta suggests that maybe Izzy should just tell him the truth. Maybe he's like you. Yeah, Izzy smiles. Or worse he could be just like you, she says. "Still maybe you're right. I'm going to meet him for dinner now. Maybe I should just tell him . . . " She smiles. I can't believe I'm actually taking advice from you. Greta smirks. Neither can I. Cool, huh?

Izzy 5

Izzy is at the west end of the campus restaurant—alone at a table for 2. She pops out her cell and hits redial. But it goes right to Arun's voice mail. She sits for another moment, then jerks up and storms out of there.

Izzy 6

Someone is sneaking up behind her. She spins and slaps the person in the face. It's Arun. How dare he not show up! I had some outside business to take care of, he explains. Oh really? So you couldn't let me know. It was impossible to get away. I bet. So who is she?, Izzy fumes. What? No. It's not a girl. Who was it then?, Izzy doesn't believe him. He looks sheepish. My parents. Izzy rolls her eyes. Christ not them again. I know, I know. But sometimes real life gets in the way. So what are going to do about them? You ever going to tell them about me?, Izzy puts it to him. Arun starts to hem and haw. I can't. Then he presents her with a rose with a broken stem. She just gives him an "are you serious?" look . . .

Izzy 7

Arun and Izzy are piled up in the tangle of bodies at the bottom of the stairs. Izzy feels Arun push her to the side as he stands up. She reaches out to him to help her up, but he sneers at her and says, I don't think I have enough talent to help you up. And then he turns his back to her. She gets up and goes to him. "What the hell's your problem?" He turns on her and screams, "What's my problem? What's your problem? All of a sudden you take my dreams and shred them in front of me in a matter of seconds." "Ok, I'm sorry," she says. "No you're not." She considers. "You're right, I'm not." Arun looks at her. "Who are you?" Izzy thinks about this. Then looks up at him. "Who are YOU?"

Izzy 8

Izzy and Arun step out of the frat building and are confronted by the Freedom Group. There's a tremor. They're like, perfect timing—your boyfriend is here too. Are you in or out? Izzy is confused—she remembers that they talked about this, but she can't remember what they were going to say to Arun. The Freedom Group guys think she's messing with them. Arun pulls her aside. Just then, the tremor hits heavy and the Freedom Group guys start to disappear. And in a moment, they're all gone . . . .

Izzy 9

Arun and Izzy back away from where the Freedom Group guys just disappeared. "What the hell was that?" Arun is completely freaking out. They look around for the source of what could have caused the disappearance. There's nothing. Izzy says "What happened to them?" Instead of answering, Arun turns around and takes off. It takes a sec, but then Izzy notices he's gone. She looks at him go. "Hey asshole! What about me?!" But he's out of there. Izzy slowly creeps back, careful of every step. Totally freaked. Then she hears a voice. It's Greta calling out to her. She looks over and sees Greta, who's all excited standing in the path of an oncoming bus. Izzy's eyes grow wide and she races to the street, yelling "Nooooooo!" Too late. Greta gets mowed down by a bus. Izzy arrives, bends down to help her, but Greta pops right back up. But then there's a tremor. Greta looks at the shaking all around her. Damn! she says. Wonder if I can get my money back. Izzy watches Greta disappear right before her eyes.
End Film Becca leads Ari and Arun over to Izzy. All four of them are panicky, confused and scared. "What the hell just happened to Greta?! Ari shouts." "Not another one!" Arun exclaims. He turns to leave again. Izzy is disgusted—"My hero". This bothers Arun and he turns back. "What do you mean another one?" Becca asks. Izzy tells Becca and Ari about how the Freedom Group guys disappeared too. Becca and Ari explain to Arun and Izzy their theory that they're in some kind of Rosemary's Baby place where everyone is in on some huge conspiracy. Izzy makes the connection that she saw tremors before the Freedom Group Guys disappeared and also saw them before Greta disappeared. How did they get here? Before they can launch into more theories, they see Security coming. "Man I hate these guys," Ari says. Becca quickly says they need to get off this campus before they're the next ones to disappear. Tremors start up again. As they are running, Arun grabs Izzy's arm and starts to say "I didn't mean to—" Izzy yanks her arm away and ignores him completely. They have to use some crafty moves to elude the Guards who seem to appear at every turn. Finally, they make their way to the main gate of the campus. They are relieved as they rush through the gate. And BLINK—the four of them are right back in the middle of Campus. What the hell just happened?!?! How did they go from the front gate to the middle of campus in one step? The tremors increase with such intensity that they all struggle to stay on their feet. They all look at each other knowing they're going to disappear. They hold hands and say goodbye with their eyes. Just as the Tremors hit their peak, they suddenly stop. They don't get it, but no time to dwell on it, campus security is bearing down. They head for the back entrance. Managing to slip once again past the guards, they scramble to the back gate and rush out . . . . BLINK—they're back in the middle of campus. They all can't believe it. Izzy cries "What kind of game are they playing with us?!?" And then it hits Becca. The indestructible flesh, people being deleted, Greta hoping she gets her money back and now the looping back to the center, the guards saying they need to be eliminated—They are in game. A computer simulation game! CUT TO: Silicon Valley. A nerdy young programmer looks at several large screens full of computer code. He's never seen a multiple virus like this. Four separate viruses somehow acting together. He reaches onto the shelf and pulls down an anti-virus software package. Ari, Izzy and Arun all tell Becca she's crazy. Someone created us? We're not real? Come on, Becca. That's a little too far fetched. And Becca comes back at them—"Really. What can you guys remember about your parents? Cuz I've been thinking about it, and I can't remember anything. I have no memory of having any parents at all." They can't recall. She pushes them some more. She asks Izzy where she comes from? Ari what his high school was called. Arun what his first memory was. Arun thinks and says, "just being here". As they continue to process the revelation, they are interrupted by a horrible sound. They turn. A giant, Terminator-like entity appears and attacks. If we are in a game, why is it trying to get rid of us?

No one can answer that and besides there's no time to ponder. All four of them use their wits and skills to outflank the anti-virus and destroy it. Then they look at each other . . . confused and scared. They wonder who their creators are . . . . CUT TO: The Human dopplegangers. We introduce the 5 creators and end.

As discussed above, a viewer signs/logs in to gain access to video/story segments as subsets of a moving picture story that with other stories makes up an entire JumpView interactive video system library. The exemplary process may also be employed for written stories, audio performances, paintings, photos, video games or any other artistic showing.

It is understood that the Jump View Interactive Video System and methods thereof described and shown are exemplary indications of preferred embodiments of the invention, and are given by way of illustration only. In other words, the concept of the present invention may be readily applied to a variety of preferred embodiments, including those disclosed herein. For example, while the specific story discussed above is fictional, it is understood that the story plots may be in fictional, non-fictional and reality formats. As another example, while the story is presented in video, film or movie format, it is understood that the preferred embodiments also include audio only segments for use with a radio or other communication device that includes a speaker. While the invention has been described in detail and with reference to specific examples thereof, it will be apparent to one skilled in the art that various changes and modifications can be made therein without departing from the spirit and scope thereof. Without further elaboration, the foregoing will so fully illustrate the invention that others may, by applying current or future knowledge; readily adapt the same for use under various conditions of service.

What is claimed is:

1. A method of reproducing a story at a user terminal, the method comprising the steps of:
   (A) giving a user access to an electronic copy of a video story, said video story having a plurality of parallel video streams which correspond to a plurality of parallel story timelines to said video story, respectively, wherein each of said parallel video streams includes a respective plurality of video segments which are located in a storage medium, and are in chronological order, said plurality of video segments are represented by a plurality of icons, each along one of a plurality of visual timelines on an on-screen interface, ones of said icons each along a respective one of said plurality of visual timelines which corresponds to a respective one of the parallel video streams;
   (B) receiving from the user a user requested first selection of a first one of the video segments from one of the parallel video streams;
   (C) reproducing packets of video data corresponding to the user requested first selection of the first one of the video/story segments to play the user requested first selection at the user terminal;
   (D) receiving from the user a user requested second selection of a second one of the video segments from another of said parallel video streams, wherein the second one of the video segments is not limited to being chronologically after and chronologically at the same time as the one of the video segments, and wherein each of said parallel video streams corresponds to a respective audio sequence prior to step (A);
   (E) reproducing packets of video data corresponding to the user requested second one of the video segments to play the user requested second selection at the user terminal, and indicating on the on-screen interface which of the video segments have been reproduced;

(F) reproducing packets of video data corresponding to a third one of the video segments from any of the parallel video streams to play the third one of the video story segments at the user terminal;

wherein said third one of said video segments is later in chronological time in said video story than said first one and said second one of said video segments, and steps (D) and (E) occur after steps (B) and (C) and before step (F);

and wherein said first one of said video segments with its corresponding audio sequence from said one of said parallel video streams and another of said video segments with its corresponding audio sequence from said another of said parallel video streams occur at the same time in said video story and are respectively different in both video and audio content.

2. The method of claim 1, further comprising, prior to Step (F), authorizing reproducing of the third one of the video segment at the user terminal only upon prior reproducing of a threshold amount of the video/story segments to the user terminal.

3. The method of claim 1, wherein each of said parallel video streams corresponds to a respective character.

4. The method of claim 1, wherein each of said parallel video streams corresponds to a respective event.

5. The method of claim 1, wherein each of said parallel video streams corresponds to a respective location.

6. The method of claim 1, wherein each of said parallel video streams corresponds to a respective time period.

7. The method of claim 1, wherein Step (D) begins after Step (C).

8. The method of claim 1, wherein Step (F) begins after Step (E).

* * * * *